(12) United States Patent
Mickle et al.

(10) Patent No.: US 7,825,807 B2
(45) Date of Patent: Nov. 2, 2010

(54) TRANSPONDER NETWORKS AND TRANSPONDER SYSTEMS EMPLOYING A TOUCH PROBE READER DEVICE

(75) Inventors: Marlin H. Mickle, Pittsburgh, PA (US); Peter J. Hawrylak, Woodstown, NJ (US); Leonid Mats, Pittsburgh, PA (US)

(73) Assignee: University of Pittsburgh - Of the Commonwealth System of Higher Education, Pittsburgh, PA (US)

( * ) Notice: Subject to any disclaimer, the term of this patent is extended or adjusted under 35 U.S.C. 154(b) by 226 days.

(21) Appl. No.: 11/971,292

(22) Filed: Jan. 9, 2008

(65) Prior Publication Data
US 2008/0169928 A1 Jul. 17, 2008

Related U.S. Application Data

(60) Provisional application No. 60/884,524, filed on Jan. 11, 2007, provisional application No. 60/895,297, filed on Mar. 16, 2007.

(51) Int. Cl.
*G08B 13/14* (2006.01)

(52) U.S. Cl. .............. 340/572.1; 340/572.4; 340/572.7; 235/492; 343/873; 343/895

(58) Field of Classification Search .............. 340/572.4, 340/572.7; 235/492; 343/873, 895
See application file for complete search history.

(56) References Cited

U.S. PATENT DOCUMENTS

| | | | |
|---|---|---|---|
| 3,697,876 A | 10/1972 | Robbins et al. | |
| 6,289,237 B1 | 9/2001 | Mickle et al. | |
| 6,406,990 B1 | 6/2002 | Kawai | |
| 6,523,734 B1 | 2/2003 | Kawai et al. | |
| 6,615,074 B2 | 9/2003 | Mickle et al. | |
| 6,664,645 B2 | 12/2003 | Kawai | |
| 6,856,291 B2 | 2/2005 | Mickle et al. | |
| 7,039,359 B2 | 5/2006 | Martinez | |
| 7,057,514 B2 | 6/2006 | Mickle et al. | |
| 7,084,605 B2 | 8/2006 | Mickle et al. | |
| 7,124,942 B2 | 10/2006 | Steffen | |
| 7,224,280 B2 * | 5/2007 | Ferguson et al. | 340/572.7 |
| 7,242,996 B2 * | 7/2007 | Roesner | 700/117 |
| 7,342,490 B2 * | 3/2008 | Herrmann et al. | 340/572.7 |
| 2004/0125040 A1 | 7/2004 | Ferguson et al. | |
| 2006/0226982 A1 | 10/2006 | Forster | |
| 2006/0238989 A1 | 10/2006 | Manes et al. | |
| 2006/0255941 A1 | 11/2006 | Carrender et al. | |
| 2009/0038746 A1 * | 2/2009 | Tucholski | 156/238 |

OTHER PUBLICATIONS

Mi et al., "RF Energy Harvesting with Multiple Antennas in the Same Space", IEEE Antennas and Propagation Magazine, vol. 47, No. 5, Oct. 2005, pp. 100-106.
Mickle et al., "Powering Autonomous Cubic-Millimeter Devices", IEEE Antennas and Propagation Magazine, vol. 48, No. 1, Feb. 2006, pp. 11-21.
Upreti, et al., "RFID Packaging Innovations: From Smart Labels to Smart Packages", RFIDUHF06-Aug. 2006, pp. 1-8.
Omron, "Manufacturing method for High Reliability Inlays", Jun. 2005, 4 pp.

* cited by examiner

*Primary Examiner*—Davetta W Goins
(74) *Attorney, Agent, or Firm*—Eckert Seamans Cherin & Mellott, LLC; Philip E. Levy, Esquire

(57) ABSTRACT

Transponder networks and transponder systems are provided which help to overcome the issues presented to transponders systems by FCC power limitations. One embodiment provides a transponder network that includes a plurality of RFID straps in order to increase the amount of memory that is practically available in the network. Other embodiments provide transponder systems employing a touch probe RFID reader device that enable information to be communicated to and from a transponder or a transponder network by establishing physical contact with the reader device rather than through an air interface.

26 Claims, 5 Drawing Sheets

TRANSPONDER NETWORKS AND TRANSPONDER SYSTEMS EMPLOYING A TOUCH PROBE READER DEVICE

CROSS-REFERENCE TO RELATED APPLICATIONS

This application claims the benefit of U.S. Provisional Application No. 60/884,524, entitled "RFID Strap Network and Mono-Probe Extension," which was filed on Jan. 11, 2007, and U.S. Provisional Application No. 60/895,297, entitled "Security And Item Level RFID On Blister Packs," which was filed on Mar. 16, 2007, the disclosures of which are incorporated herein by reference.

FIELD OF THE INVENTION

The present invention relates to transponder systems, such as radio frequency identification (RFID systems), and in particular to transponder networks employing a plurality of RFID straps and transponder systems employing a touch probe RFID reader device.

BACKGROUND OF THE INVENTION

RFID devices typically contain an integrated circuit chip and an antenna that are connected together to form an electrical circuit that responds to certain transmitted radio frequency (RF) signals. The integrated circuit chip has very small attachment points, commonly referred to as pads, to which the antenna must be electrically connected. Such pads are typically square surfaces with less than 100 μm per side. Antennas used in RFID applications typically have conductors that must be connected to the pads of the integrated circuit chip that have widths of much greater than 100 μm. This difference in relative size makes the manufacture of RFID devices difficult.

As a manufacturing aid, an intermediate fabrication step is frequently employed where an intermediate component is first formed by attaching the integrated circuit chip to relatively short interfacing conductors that have a first end that is much larger than 100 μm and a second end that is sized to accommodate the smaller pads of the integrated circuit chip. This intermediate component that includes the chip and the interfacing conductors is commonly referred to as a strap. Particular strap embodiments are commercially available from a number of sources and are typically sold in large quantities to RFID device manufacturers. In the final manufacturing steps, the strap is attached to the antenna, and both are placed on some form of a substrate. The combination of a strap and an antenna on a substrate is commonly referred to as an inlay. The inlay may later be attached to a label or the like to form an RFID tag that may be attached to a product or item in order to track and/or communicate with the product or item using RF signals.

In many RFID implementations, such as those designed in accordance with the EPCglobal Class 1 Gen 2 specification, the chip/tag is powered by the continuous wave (CW) RF energy provided by an RFID reader device. FCC limits on the CW RF power that may be transmitted dictate certain chip power requirements and operating (maximum) distances. Thus, in such implementations, there is a limitation on the amount of memory that is practically available based on the power limitations. There is therefore room for improvement in the area of transponders and transponder systems, and in particular there is a need for transponders and transponder systems that help to overcome the issues presented by these power limitations.

SUMMARY OF THE INVENTION

In a first embodiment, the invention provides a transponder network that includes a plurality of RFID straps each including a substrate, first and second leads provided on the substrate, and a chip having a memory and one or more contacts provided on the substrate. Each of the first and second leads is electrically coupled to a respective one or more of the one or more contacts. In addition, the first leads of each of the RFID straps are electrically coupled to one another and the second leads of each of the RFID straps are electrically coupled to one another. Each of the RFID straps is provided with a unique identifier to enable the memory thereof to be selectively accessed. In one particular embodiment, the first leads of each of the RFID straps are electrically coupled to one another by a first conductor, the second leads of each of the RFID straps are electrically coupled to one another, and the first conductor and the second conductor are operatively coupled to an antenna for receiving and transmitting RF signals. Each of the RFID straps may include an internal power source for providing power to the RFID strap, or, alternatively, each of the RFID straps may be passive and be powered by one or more RF signals received by the transponder network.

In another embodiment, the invention provides a transponder system that includes at least one transponder and a reader device. The at least one transponder includes a substrate, one or more leads provided on the substrate, and a chip having one or more contacts provided on the substrate, wherein each of the one or more leads is electrically coupled to a respective one or more of the one or more contacts. The at least one transponder has an antenna having a first terminal and a second terminal wherein the first terminal is connected to one of the one or more leads. The reader device includes a control system, a radio module and a touch probe having a probe contact operatively coupled to the radio module. The radio module is adapted to generate one or more RF signals under the control of the control system. The probe contact is operatively coupled to the radio module for receiving the one or more RF signals and is structured to be temporarily brought into electrical contact with at least one of the antenna and the one of the one or more leads of the at least one transponder. When the probe contact receives the one or more RF signals and is brought into electrical contact with at least one of the antenna and the one of the one or more leads of the at least one transponder, the one or more RF signals are communicated to the at least one transponder. In one particular embodiment, the one or more leads comprise a first lead and a second lead, wherein the first terminal is connected to the first lead. In addition, the second terminal may be connected to the second lead. In such a case, the probe contact is structured to be temporarily brought into electrical contact with at least one of the antenna, the first lead and the second lead, and wherein when the probe contact receives the one or more RF signals and is brought into electrical contact with at least one of the antenna, the first lead and the second lead, the one or more RF signals is communicated to the at least one transponder. Preferably, the touch probe is a mono-probe and the probe contact is the only contact of the touch probe.

In still another embodiment, the invention provides a method of communicating with a transponder apparatus that includes a substrate, one or more leads provided on the substrate, a chip having one or more contacts provided on the substrate, wherein each of the one or more leads being electrically coupled to a respective one or more of the one or more contacts, and an antenna having a first terminal and a second terminal wherein the first terminal is connected to one of the one or more leads. The method includes steps of providing a reader device having a touch probe having a single probe contact, generating one or more RF signals in the reader device and providing the one or more RF signals to the single probe contact, and bringing at least one of the antenna and the one of the one or more leads of the transponder apparatus into electrical contact with the single probe contact to allow the one or more RF signals to be communicated to the transponder apparatus or to allow one or more transponder signals to be communicated from the transponder apparatus to the reader device. The one or more leads may comprise a first lead and a second lead, wherein the first terminal is connected to the first lead. In addition, the second terminal may be connected to the second lead, wherein the bringing step comprises bringing at least one of the antenna, the first lead and the second lead into electrical contact with the single probe contact to allow the one or more RF signals to be communicated to the transponder apparatus or to allow one or more transponder signals to be communicated from the transponder apparatus to the reader device.

In yet another embodiment, an RF reader device is provided that includes a control system, a radio module adapted to generate one or more RF signals under the control of the control system, and a touch probe having a single probe contact operatively coupled to the radio module. The single probe contact is structured to receive the one or more RF signals. In addition, the single probe contact is adapted to be temporarily brought into electrical contact with at least one of an antenna and one of one or more leads of a transponder apparatus to allow at least the one or more RF signals to be communicated to the transponder apparatus or to allow one or more transponder signals to be communicated from the transponder apparatus to the RF reader device.

In still another embodiment, a transponder system is provided that includes at least one transponder network and a reader device. The at least one transponder network includes a plurality of RFID straps, wherein each of the RFID straps includes a substrate, first and second leads provided on the substrate, and a chip having a memory and one or more contacts provided on the substrate. Each of the first and second leads is electrically coupled to a respective one or more of the one or more contacts, the first leads of each of the RFID straps are electrically coupled to one another by a first conductor, and the second leads of each of the RFID straps are electrically coupled to one another by a second conductor. The reader device includes a control system, a radio module and a touch probe having one or more probe contacts operatively coupled to the radio module. The radio module is adapted to generate one or more RF signals under the control of the control system, and the one or more probe contacts are operatively coupled to the radio module for receiving the one or more RF signals. The one or more probe contacts are also structured to be temporarily brought into electrical contact with at least a portion of the at least one transponder network. When the one or more probe contacts receive the one or more RF signals and are brought into electrical contact with the at least a portion of the at least one transponder network, the one or more RF signals are communicated to each of the chips of the at least one transponder network. In one particular embodiment, the one or more probe contacts are structured to be temporarily brought into electrical contact with the first conductor and the second conductor. In this embodiment, when the one or more probe contacts receive the one or more RF signals and are brought into electrical contact with the first conductor and the second conductor, the one or more RF signals are communicated to each of the chips of the at least one transponder network. In another particular embodiment, the at least one transponder network has an antenna having a first terminal and a second terminal wherein the first terminal is connected to the first conductor. In this embodiment, the one or more probe contacts comprise a single probe contact structured to be temporarily brought into electrical contact with at least one of the antenna and the first conductor. When the single probe contact receives the one or more RF signals and is brought into electrical contact with at least one of the antenna and the first conductor, the one or more RF signals are communicated to each of the chips of the at least one transponder network. In addition, the second terminal may be connected to the second conductor, wherein the single probe contact is structured to be temporarily brought into electrical contact with at least one of the antenna, the first conductor and the second conductor. When the single probe contact receives the one or more RF signals and is brought into electrical contact with at least one of the antenna, the first conductor and the second conductor, the one or more RF signals are communicated to each of the chips of the at least one transponder network. In any of the just described embodiments, each of the RFID straps may be provided with a unique identifier to enable the memory thereof to be selectively accessed.

In still a further embodiment, a method of communicating with a transponder network is provided, wherein the transponder network includes a plurality of RFID straps, each of the RFID straps including a substrate, first and second leads provided on the substrate, and a chip having a memory and one or more contacts provided on the substrate. Each of the first and second leads is electrically coupled to a respective one or more of the one or more contacts, wherein the first leads of each of the RFID straps are electrically coupled to one another by a first conductor and the second leads of each of the REID straps are electrically coupled to one another by a second conductor. The method providing a reader device having a touch probe having a one or more probe contacts, generating one or more RF signals in the reader device and providing the one or more RF signals to the one or more probe contacts, and bringing the one or more probe contacts into electrical contact with at least a portion of the transponder network to allow the one or more RF signals to be communicated to each of the chips of the transponder network or to allow one or more transponder signals to be communicated from the transponder network to the reader device. The transponder network may have an antenna having a first terminal and a second terminal wherein the first terminal is connected to the first conductor. In such an embodiment, the one or more probe contacts comprise a single probe contact structured to be temporarily brought into electrical contact with at least one of the antenna and the first conductor, and wherein the bringing the one or more probe contacts into electrical contact with at least a portion of the transponder network comprises bringing the one or more probe contacts into electrical contact with at least one of the antenna and the first conductor. In addition, the second terminal may be connected to the second conductor, wherein the bringing the one or more probe contacts into electrical contact with at least a portion of the transponder network comprises bringing the one or more probe contacts into electrical contact with at least one of the antenna, the first conductor and the second conductor.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
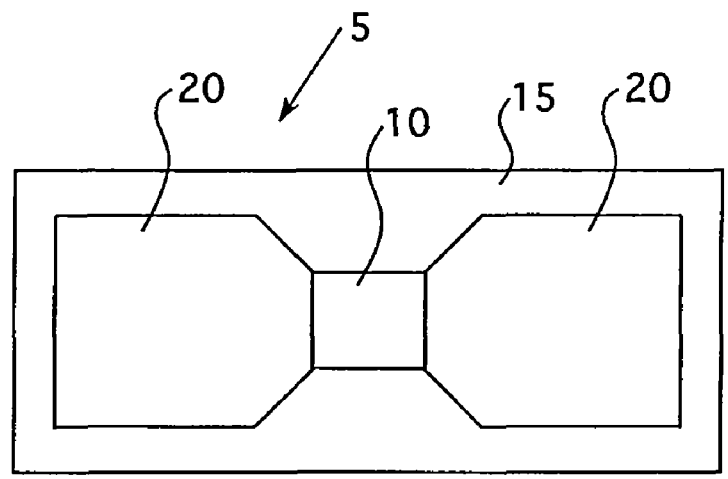
FIG. 1 is a schematic representation of a prior art strap that may be employed as part of a transponder network according to one embodiment of the present invention.

FIG. 1 is a schematic representation of an embodiment of an example strap 5 that may be employed in the present invention. As used herein, the term "strap" shall refer to an intermediate RF component that includes an integrated circuit chip operatively coupled to one or more interfacing conductors, either or both of which may (although not necessarily) be mounted on and supported by a substrate, wherein the interfacing conductors have a first end that is sized to accommodate the smaller pads of the integrated circuit chip and a second end that is typically larger than the first end to, for example, allow easy connection to another component such as an antenna. The strap 5 shown in FIG. 1 includes a chip 10 having chip contacts (not shown) that is mounted on and supported by a strap substrate 15. The strap substrate 15 may be made of any of a variety of suitable materials, such as, for example, suitable flexible polymeric materials like PET, polypropylene or other polyolefins, polycarbonate, or polysulfone. The chip 10 may be any of a variety of suitable electronic components for electrically coupling to and suitably interacting with an RFID reader as described herein to, for example, receive and/or to send signals. The contacts of the chip 10 are electrically coupled to strap leads 20 that are provided on the strap substrate 15. The strap leads 20 may be made out of an electrically conducting material, such as, without limitation, a metal foil, a metal/conductive ink or a conductive polymer as described in, for example, U.S. patent application Ser. Nos. 11/448,516 and 11/430,718, entitled "Method Of Making An Electronic Device Using An Electrically Conductive Polymer, And Associated Products," the disclosures of which are incorporated herein by reference. In some embodiments, the strap leads 20 may include an electrically insulating material along selected portions of the conducting material. Alternatively, the strap leads 20 may include a dielectric material with conductive layers on one or both sides.

Figure 2:
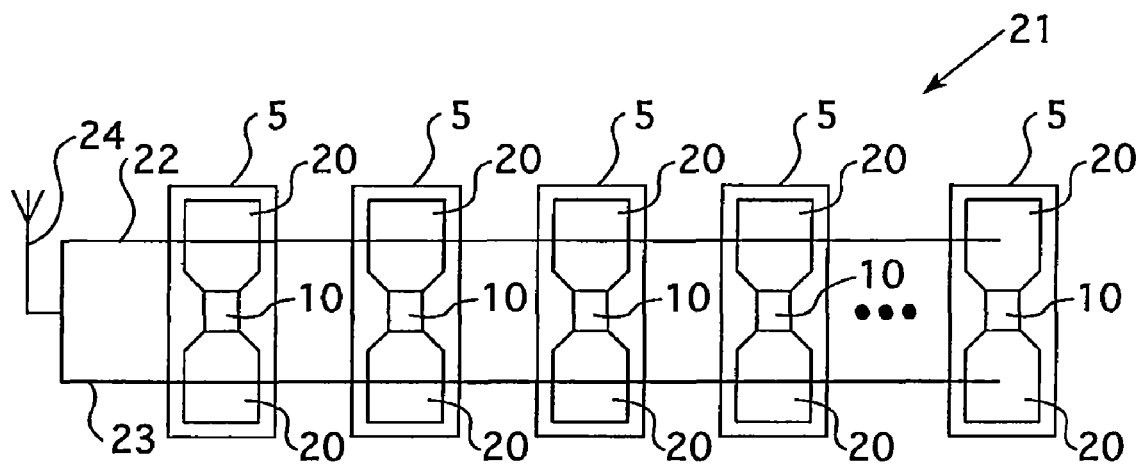
FIG. 2 is a schematic diagram of an embodiment of a strap network according to the present invention.

As described elsewhere herein, normally, the strap leads 20 would be operatively coupled, through a suitable electrically-conductive connection, to an antenna provided on a substrate to form an inlay and thus form an RFID transponder, also known as a tag. However, according to an embodiment of the present invention, a plurality of straps 5 may be used to form a strap network 21 as shown in FIG. 2. As seen in FIG. 2, the strap network 21 includes a plurality of straps 5 that are connected in parallel. In particular, the top strap leads 20 of each of the straps 5 are electrically coupled to one another by a first conductor 22 and the bottom strap leads 20 of each of straps 5 are electrically coupled to one another by a second conductor 23. The first and second conductors 22 and 23 may be made out of any suitable electrically conducting material, such as, without limitation, a metal foil, a metal/conductive ink or a conductive polymer. The first and second conductors 22, 23 are then operatively coupled to an antenna 24, such as, for example, a square spiral antenna or any other suitable antenna type, to enable the strap network 21 to communicate using RF signals over an air interface with, for example, an RFID reader. In addition, each of chips 10 forming a part of the straps 5 is preferably provided with control circuitry, such as a microprocessor, a microcontroller or some other suitable custom control circuitry, and an associated memory. Furthermore, each chip 10 and thus each strap 5, is associated with a unique identifier that enables the memory of each of the chips 10 to be selectively accessed (addressed) by an RFID reader over the air interface through the antenna 24. Thus, the strap network 21 provides increased memory capacity as compared to a single strap 5 (or RFID tag made with a strap 5). For example, if the memory capacity of each chip 10 is m bits, then the strap network 21 will have a total memory capacity of n*m bits.

Moreover, each strap 5 in the strap network 21 is, in the preferred embodiment, a passive strap, meaning it does not have an internal power supply. Instead, such passive straps (and passive RFID tags) are powered by electrical current that is induced therein by the RF signal sent by an RFID reader. Specifically, in the strap network 21, if the transmitted RF power is large enough, the electrical current induced in the antenna 24 by the incoming RF signal from the RFID reader will provide enough power for each of the chips 10 to power up and function, e.g., transmit a response. One passive tag technology, known as backscatter technology, generates signals by backscattering the carrier signal sent from the RFID reader. In another technology, described in U.S. Pat. Nos. 6,289,237, 6,615,074, 6,856,291, 7,057,514, and 7,084,605 (and commonly referred to as energy harvesting), the disclosures of which are incorporated herein by reference, RF energy from the RFID reader is harvested and converted to a DC voltage by an antenna/matching circuit/charge pump combination. The DC voltage is then used to power the circuitry (e.g., a processor/transmitter combination) that transmits information to the RFID reader at, for example, a different frequency.

Figure 3:
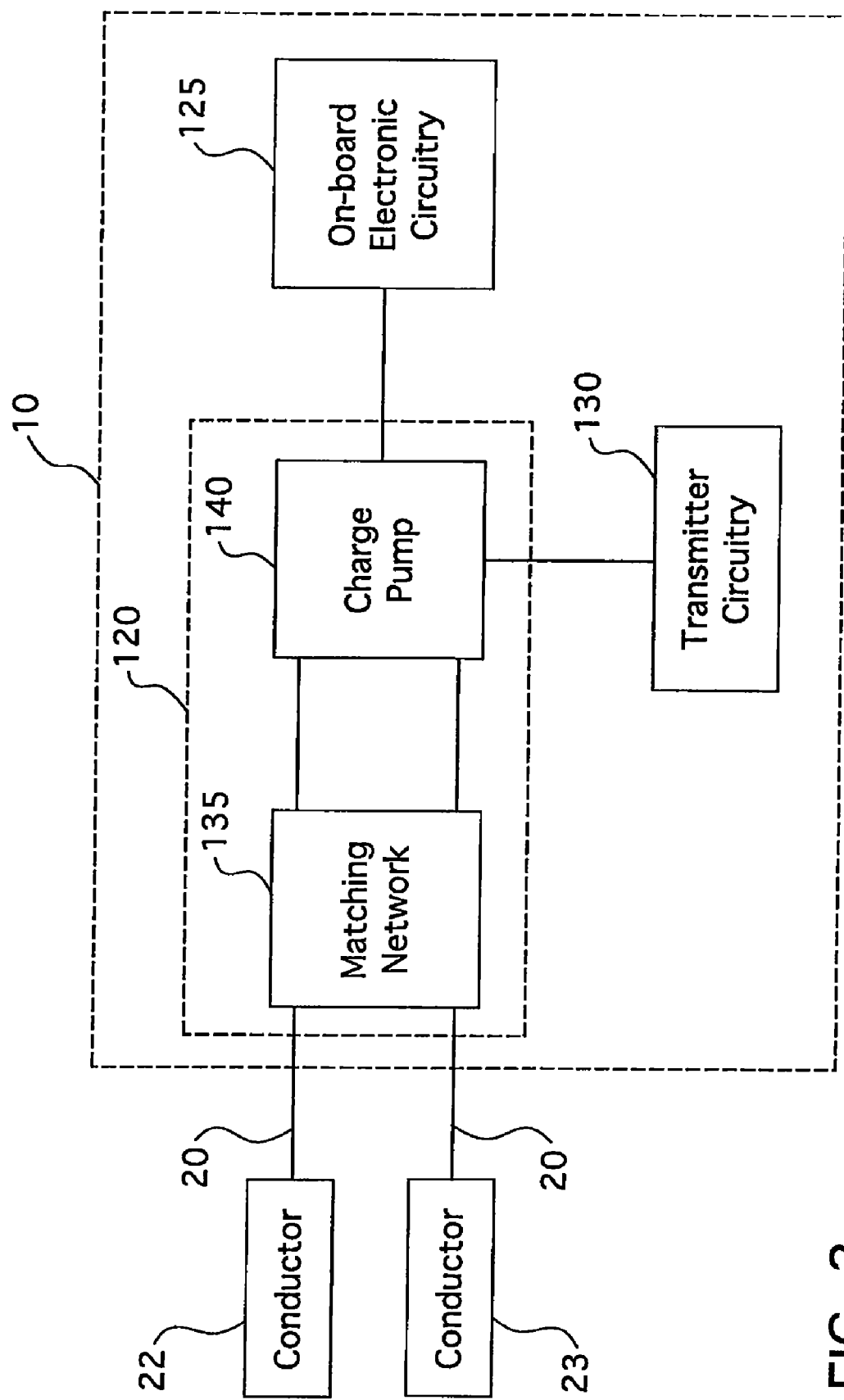
FIG. 3 is a schematic representation of one particular embodiment wherein passive technology in the form of energy harvesting is employed to power each of the chips in the strap network of FIGS. 2, 4 and 5.

FIG. 3 is a schematic representation of one particular embodiment wherein passive technology in the form of energy harvesting as just described is employed to power each of the chips 10 in the strap network 21. As seen in FIG. 3, each chip 10 includes energy harvesting circuitry 120 that is operatively coupled to on-board electronic circuitry 125, which in turn is operatively coupled to transmitter circuitry 130. In operation, the energy harvesting circuitry 120 is structured to receive RF energy (e.g., from a reader device) and harvest energy therefrom by converting the received RF energy into DC energy, e.g., a DC voltage. The DC voltage is then used to power the on-board electronic circuitry 125 and the transmitter circuitry 130. The transmitter circuitry 130 is structured to transmit an RF information signal to a receiving device such as an RFID reader. As described elsewhere herein, the onboard electronic circuitry 125 may include, for example, control circuitry, such as a microprocessor, a microcontroller or some other suitable custom control circuitry, an associated memory, additional logic circuitry, and/or a sensing circuit for sensing or measuring a particular parameter (such as temperature, in which case a thermistor may be included in the sensing circuit).

In the particular embodiment shown in FIG. 3, the energy harvesting circuitry 120 of each chip 10 includes a matching network 135 electrically connected to the first and second conductors 22 and 23 (through the strap leads 20), and therefore to the antenna 24. The matching network 135 is also electrically connected to a voltage boosting and rectifying circuit preferably in the form of a one or more stage charge pump 140. Charge pumps are well known in the art. Basically, one stage of a charge pump essentially doubles the effective amplitude of an AC input voltage with the resulting increased DC voltage appearing on an output capacitor. The voltage could be stored using a rechargeable battery. Successive stages of a charge pump, if present, will essentially increase the voltage from the previous stage resulting in an increased output voltage. In operation, the antenna 24 receives RF energy that is transmitted in space by a far-field source, such as an RFID reader. The RF energy received by the antenna is provided, in the form of an AC signal, to each charge pump 140 through the associated matching network 135. The charge pump 140 rectifies the received AC signal to produce a DC signal that is amplified as compared to what it would have been had a simple rectifier been used.

In the preferred embodiment, the matching network 135 for each chip 10 is chosen (i.e., its impedance is chosen) so as to maximize some criterion such as the voltage of the DC signal output by charge pump 140. In other words, the matching network 135 matches the impedance of the antenna 24 to the charge pump 140 solely on the basis of maximizing the performance such as DC output of the charge pump 140. In the preferred embodiment, the matching network 135 is an LC circuit of either an L topology (which includes one inductor and one capacitor) or a $\pi$ topology (which includes one inductor and two capacitors) wherein the inductance of the LC circuit and the capacitance of the LC circuit are chosen so as to maximize the DC output of the charge pump 140. The particulars of the matching network (e.g., the particular LC parameters) may be chosen so as to maximize the output of the charge pump 140 using a trial and error ("annealing") empirical approach in which various sets of inductor and capacitor values are used as matching elements in the matching network 135, and the resulting output of the charge pump 140 is measured for each combination, and the combination that produces the maximum output is chosen. In this process, the input impedance of the charge pump 140 with each matching network combination may be plotted as a point on a Smith chart with a color coding for the amount of energy harvested. After a number of tries, it will be easy to see a clustering of the color coded points to selectively choose other points in or around the cluster to achieve a near optimum value. This trial and error/annealing approach is also described in Minhong Mi, et al., "RF Energy Harvesting with Multiple Antennas in the Same Space," *IEEE Antennas and Propagation Magazine*, Vol. 47, No. 5, October 2005, and Marlin Mickle et al., "Powering Autonomous Harvesting with Multiple Antennas in the Same Space," *IEEE Antennas and Propagation Magazine*, Vol. 48, No. 1, February 2006, the disclosures of which are incorporated herein by reference.

In many applications, particularly those governed by FCC regulations, the RF power transmitted by an RFID reader will not be large enough to power each of the chips 10 in the strap network 21 shown in FIG. 2, at least not at all distances from the reader that may be required for a particular application. Thus, described herein are two alternate strap network embodiments, shown in FIGS. 4 and 5 as strap networks 21' and 21", that use touch probe technology to provide power and communicate with (i.e., read) each of the chips 10 rather than communicating over an air interface through RF signals using the antenna 24.

Figure 4:
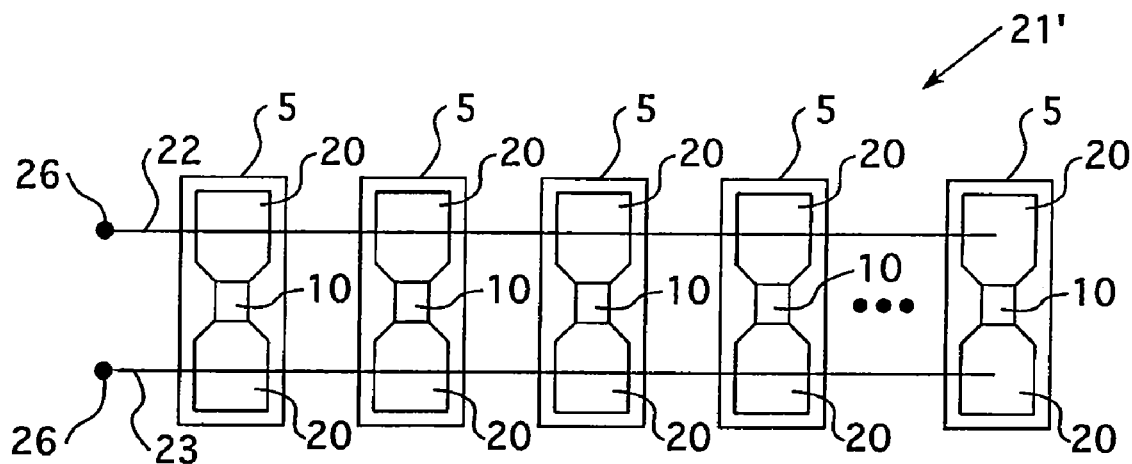
FIGS. 4, 5 and 6 are a schematic diagrams of alternative embodiments of a strap network according to the present invention.
Figure 5:
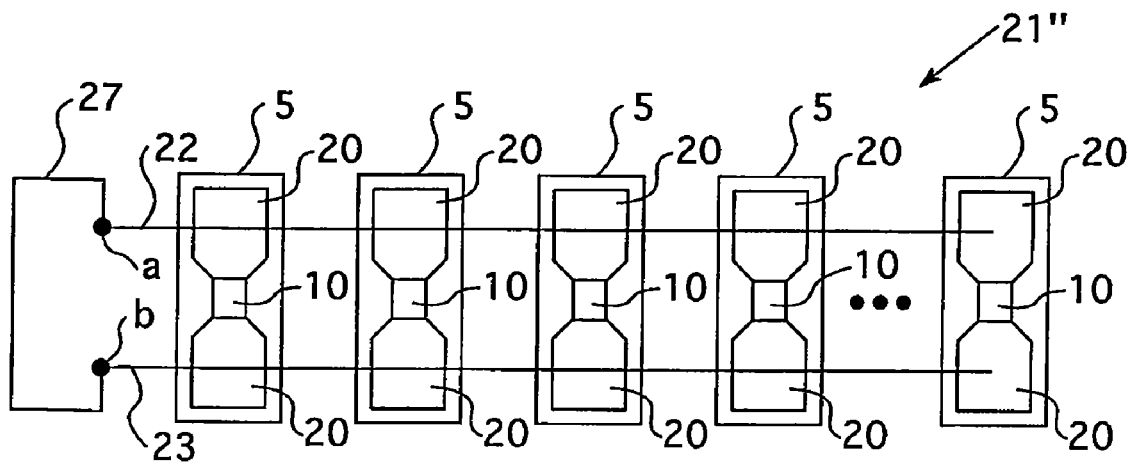

FIG. 4 shows a strap network 21' according to one particular embodiment wherein the strap network 21' is able to communicate with an RFID reader without operatively coupling the strap network 21' to an antenna such as the antenna 24 shown in FIG. 2. As seen in FIG. 4, in the strap network 21', each conductor 22, 23 terminates at a contact 26 rather than being connected to the antenna 24. FIG. 5 shows a strap network 21" according to another particular embodiment wherein the strap network 21" is also able to communicate with an RFID reader without operatively coupling the strap network 21" to the antenna 24. As seen in FIG. 5, the strap network 21" includes an antenna 27 wherein the terminal a of the antenna 27 is connected to the conductor 22 and the terminal b of the antenna 27 is connected to the conductor 23. In an alternative embodiment, the terminal a of the antenna 27 is connected to either the conductor 22 or the conductor 23, and the terminal b of the antenna 27 is not connected to the strap network 21" at all. Preferably, the antenna has a generally square shape so as to form a conductive loop as shown in FIG. 5. The antenna 27 may also take on other shapes and/or configurations, such as a circular or spiral (coil) shape, that may be necessary to achieve desired characteristics (e.g. input impedance and power) or a dipole where there is no electrical connection between conductors 22 and 23.

As described in more detail below, in the case of either the strap network 21' or the strap network 21", a direct electrical connection may be made between the strap network 21' or the strap network 21", and in particular the conductors 22 and/or 23 thereof, and a properly equipped RFID reader to enable signals to be communicated between the RFID reader and the strap network 21' or the strap network 21" (and in particular the chips 10 provided therein). As will be appreciated, a similar direct electrical connection may be made between the strap network 21, and in particular the conductors 22 and/or 23 thereof, and a properly equipped RFID reader, in which case the functionality of the antenna 24 will not be used. However, for illustrative purposes, the strap network 21' and the strap network 21" embodiments will used in the description provided below.

Figure 6:
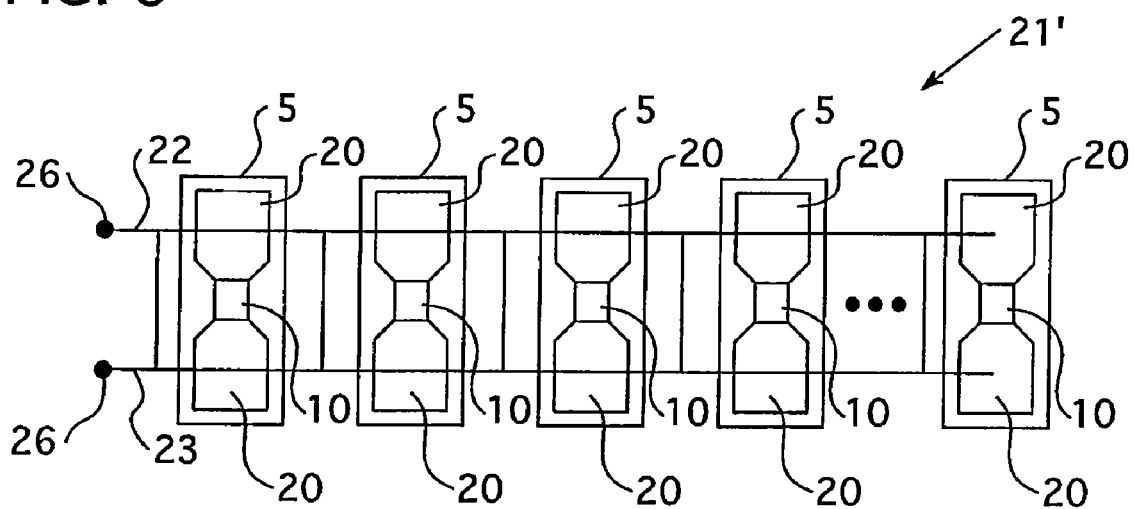

Additionally, in any of the embodiments of the strap network 21, 21', or 21", there may be multiple antenna type connections between the conductors 22 and 23, as shown in, for example, the modified strap network 21' FIG. 6. The main purpose of such inter-terminal connectivity is to provide connection redundancy and a single contact probe.

Figure 7:
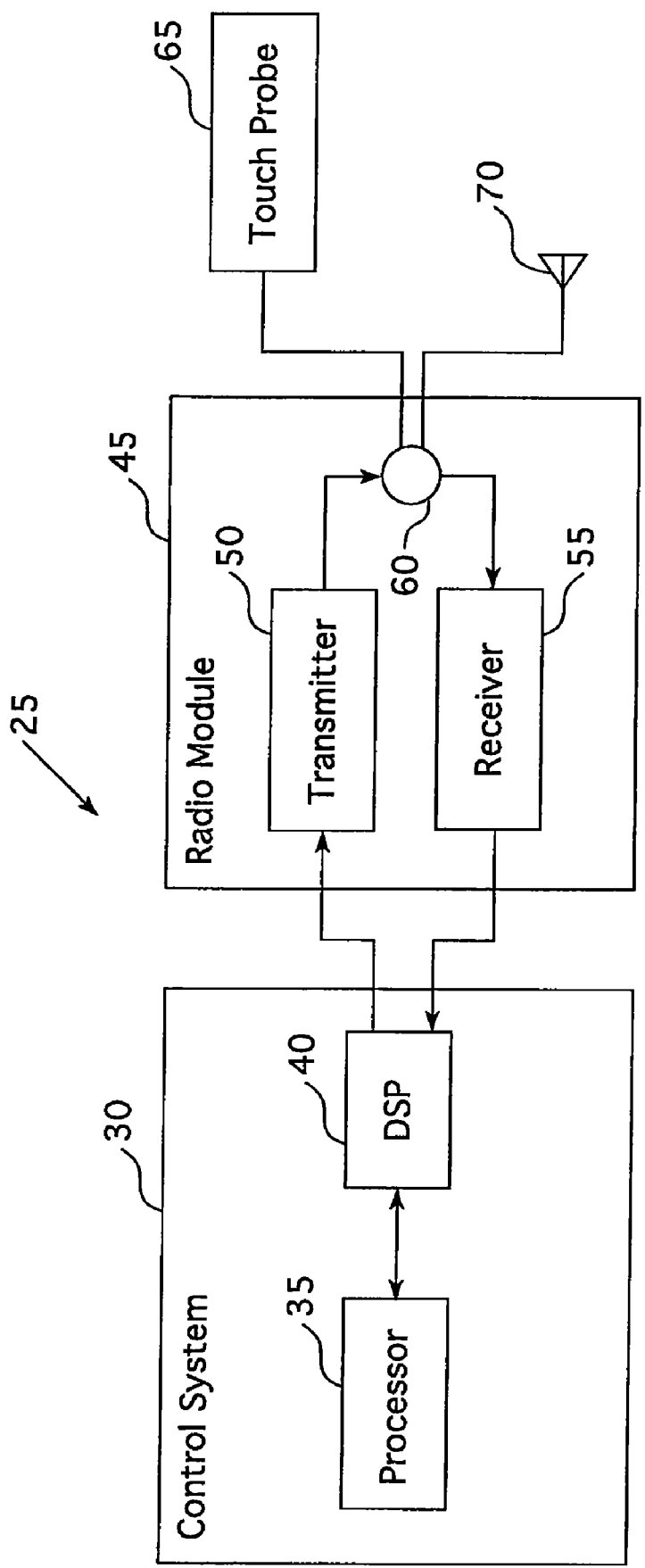
FIG. 7 is a block diagram of a reader device according to one embodiment of the invention.

In order to fully understand the operation of the strap network 21' and the strap network 21", it will be necessary to describe an embodiment of the particular type of RFID reader that must be used therewith. FIG. 7 is a block diagram of such an RFID reader 25. The RFID reader 25 includes a control system 30 and a radio module 45. In the preferred embodiment shown in FIG. 7, the control system 30 includes a processor 35, such as a microcontroller or microprocessor, and a digital signal processor (DSP) 40, although other configurations are possible. The processor 35 provides control over high level operation of the RFID reader 25 and may communicate with an external network and/or peripheral devices. The DSP 40 provides direct control over all operations of the radio module 40 in response to high level commands provided by the processor 35, and processes data signals received from individual RFID tags and/or strap networks as described herein. The radio module 40 is adapted to provide for communications to/from RFID tags or strap networks (e.g., strap network 21) provided with a suitable antenna (e.g., antenna 24), by generating and receiving RF signals in the manner described herein.

More particularly, the radio module 45 further comprises a transmitter portion 50, a receiver portion 55, and a hybrid 60. The hybrid 60 may further comprise a circulator. The transmitter portion 50 preferably includes a local oscillator that generates an RF carrier frequency. The transmitter portion 50 sends a transmission signal modulated by the RF carrier frequency to the hybrid 60, which in turn passes the signal to either or both of a touch probe 65 provided as part of the RFID reader 25 and an antenna 70 provided as part of the RFID reader 25. The hybrid 60 connects the transmitter 50 and receiver 55 portions to the touch probe 65 and antenna 70 while isolating them from each other. In particular, the hybrid 60 allows a strong signal to be sent from the transmitter portion 50 while simultaneously receiving a weak signal reflected from an RFID tag or strap network. The touch probe 65 includes one or more electrical contacts or leads that are adapted to be selectively and temporarily mated and brought into electrical contact with both of the contacts 26 of the strap network 21' (in which case the touch probe 65 would include at least two electrical contacts) or either of the conductors 22 or 23 of the strap network 21" (in which case the touch probe would preferably include only a single electrical contact, i.e., a mono-probe). In the case where both terminals a and b are connected to the conductors 22, 23 (as in FIG. 5), the single probe contact may touch either one of the conductors 22, 23, and in the case where only either the terminal a or the terminal b is connected to one of the conductors 22, 23, the single probe contact should touch the same conductor 22, 23. As such, the signals generated by the RFID reader 25, that normally would be sent over an air interface, may instead be directly transmitted to the strap network 21' or the strap network 21", as the case may be, and thus the chips 10 provided therein. Those signals, which are RF signals, may also be used to provide power to the strap network 21' or the strap network 21", as the case may be, as described elsewhere herein. Similarly, the signals generated by the chips 10, that also normally would be sent via antenna over an air interface to the RFID reader 25, may instead be directly transmitted to the RFID reader 25 through the touch probe 65. The antenna 70, on the other hand, enables communication with conventional RFID tags that are equipped with an antenna (or the strap network 21 including the antenna 24) by broadcasting the modulated signal generated by the RFID reader 25 (which may be received by the conventional RFID tags or the strap network 21) and capturing any signals radiated by the conventional RFID tags or the strap network 21. The tag/network signals, whether they are transmitted through the touch probe 65 or captured by the antenna 70, are passed back to the hybrid 60, which forwards the signals to the receiver portion 55. The receiver portion 55 mixes the captured signals with the RF carrier frequency generated by the local oscillator to directly downconvert the captured signals to a baseband information signal, which is proceed to the DSP 40 for processing thereby. In an alternative embodiment, the antenna 70 may be omitted from the RFID reader 25. As will be appreciated, in such a configuration, it will not be possible to communicate using an air interface with conventional RFID tags equipped with an antenna, but instead all communication will need to be performed through a direct connection to the touch probe 65.

Figure 8:
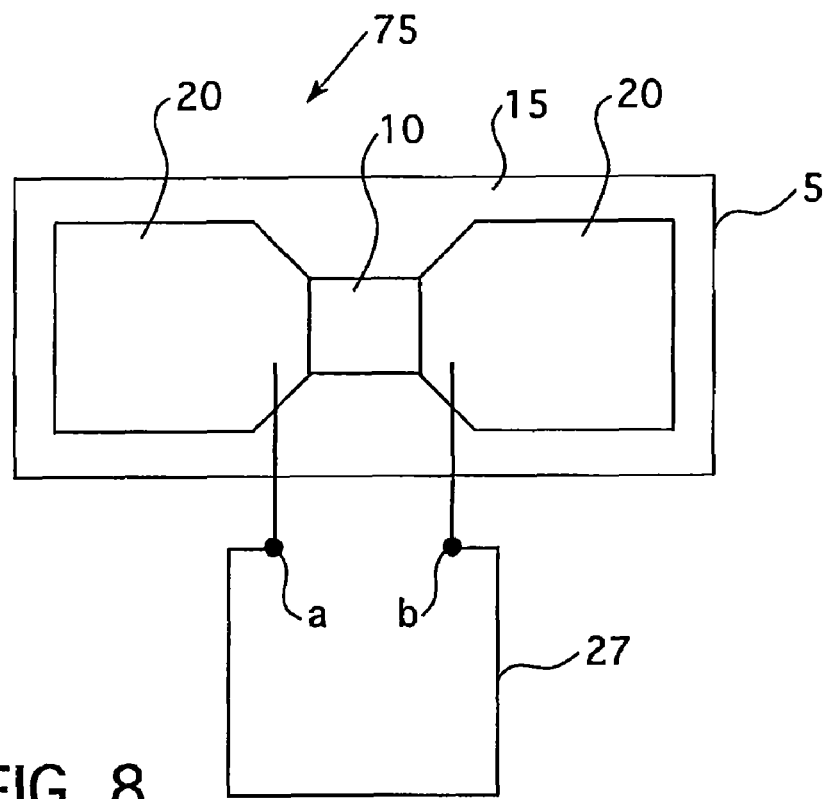
FIGS. 8 and 9 are schematic diagrams of a transponder apparatus according to two different embodiments that may be employed in a aspect of the present invention.
Figure 9:
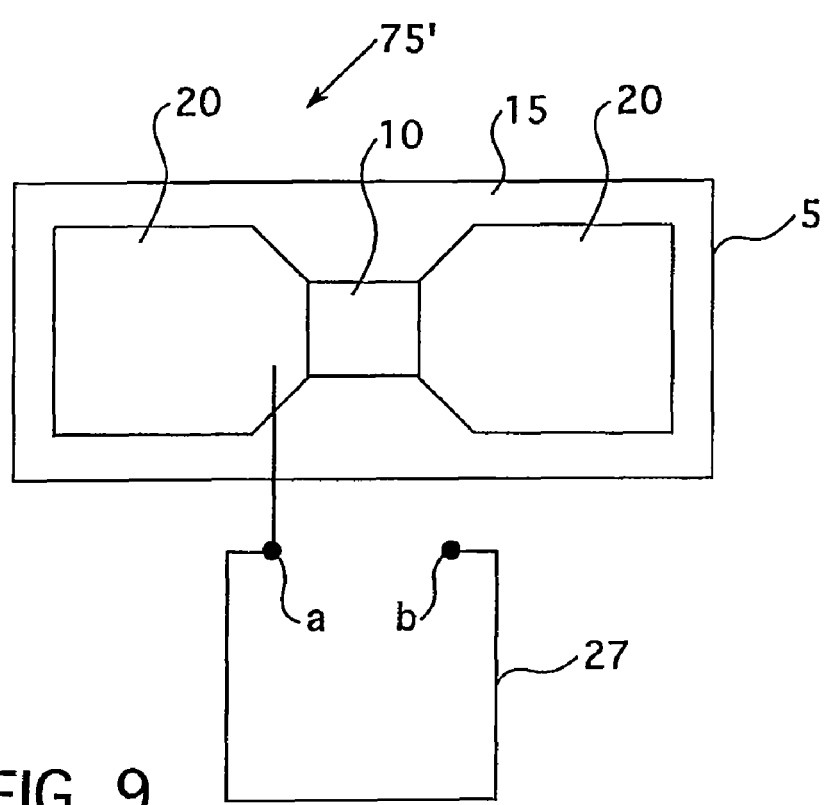

In still another embodiment, a transponder 75, shown in FIG. 8, is provided which comprises a single strap 5 configured to allow the chip 10 included therein to communicate (as described elsewhere herein) with a RFID reader 25 that includes a touch probe 65 having a single electrical contact (a mono-probe a described above). In particular, in the transponder 75, the strap 5 is operatively coupled to an antenna 27 shown in FIG. 5 so that, as described elsewhere herein, a direct electrical connection may be made between the strap 5, and in particular one of the strap leads 20, and an RFID reader 25 equipped as described above to enable signals to be communicated between the RFID reader 25 and the strap 5 (and in particular the chip 10 provided therein) of the transponder 75. Specifically, in the transponder 75, the terminal a of the antenna 27 is connected to one lead 20 and the terminal b of the antenna is connected to other lead 20. In another embodiment, a transponder 75', shown in FIG. 9, is structured so that the terminal a of the antenna 27 is connected to one of the strap leads 20 and the terminal b of the antenna 27 is not connected to the strap 5 at all. The transponders 75 or 75' may either be powered from the modulated electromagnetic field provided by the reader device, or may contain its own internal power source, such as a battery. The transponder embodiments 75 and 75' are thus similar to the strap network 21" in that they allow coupling to an RFID reader 25 having a mono-probe type touch probe 65, except that the transponder embodiments 75 and 75' have a single strap 5 rather then a network of straps 5.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A transponder network, comprising:
a plurality of RFID straps, each of said RFID straps including a substrate, first and second leads provided on said substrate, and a chip having a memory and one or more contacts provided on said substrate, each of said first and second leads being electrically coupled to a respective one or more of said one or more contacts, wherein the first leads of each of said RFID straps are electrically coupled to one another by a first conductor and the second leads of each of said RFID straps are electrically coupled to one another by a second conductor, wherein the first conductor is not electrically coupled to the second conductor, and wherein each of said RFID straps is provided with a unique identifier to enable the memory thereof to be selectively accessed.

2. A transponder network, comprising:
a plurality of RFID straps, each of said RFID straps including a substrate, first and second leads provided on said substrate, and a chip having a memory and one or more contacts provided on said substrate, each of said first and second leads being electrically coupled to a respective one or more of said one or more contacts, wherein the first leads of each of said RFID straps are electrically coupled to one another by a first conductor, wherein the second leads of each of said RFID straps are electrically coupled to one another by a second conductor, wherein said first conductor and said second conductor are operatively coupled to an antenna for receiving and transmitting RF signals, and wherein each of said RFID straps is provided with a unique identifier to enable the memory thereof to be selectively accessed.

3. The transponder network according to claim 2, wherein each of said RFID straps includes an internal power source for providing power to the RFID strap.

4. The transponder network according to claim 2, wherein each of said RFID straps is passive and is powered by one or more RF signals received by the transponder network.

5. A transponder network, comprising:
a plurality of RFID straps, each of said RFID straps including a substrate, first and second leads provided on said substrate, and a chip having a memory and one or more contacts provided on said substrate, each of said first and second leads being electrically coupled to a respective one or more of said one or more contacts, wherein the first leads of each of said RFID straps are electrically coupled to one another and the second leads of each of said RFID straps are electrically coupled to one another, wherein each of said RFID straps is provided with a unique identifier to enable the memory thereof to be selectively accessed, wherein each of said RFID straps is passive and is powered by one or more RF signals received by the transponder network, wherein the chip of each of said RFID straps includes energy harvesting circuitry, wherein at least a portion of said one or more RF signals is received in said energy harvesting circuitry, wherein said energy harvesting circuitry converts the at least a portion of said one or more RF signals into DC energy, and wherein said DC energy provides power to chip.

6. The transponder network according to claim 5, wherein the chip of each of said RFID straps further includes on-board electronic circuitry and RF transmitter circuitry, and wherein said DC energy provides power to on-board electronic circuitry and said RF transmitter circuitry.

7. The apparatus according to claim 5, wherein the energy harvesting circuitry of each chip includes a matching network having an impedance chosen in manner so as to maximize a voltage level of the DC energy.

8. The apparatus according to claim 5, wherein the energy harvesting circuitry of each chip includes a matching network having an impedance chosen in manner so as to maximize the power delivered to the chip.

9. The apparatus according to claim 5, wherein the energy harvesting circuitry of each chip includes a matching network having an impedance chosen in manner so as to maximize a physical characteristic of the energy delivered to the chip.

10. A transponder system, comprising:
at least one transponder, said at least one transponder including a substrate, one or more leads provided on said substrate, and a chip having one or more contacts provided on said substrate, each of said one or more leads being electrically coupled to a respective one or more of said one or more contacts, said at least one transponder having an antenna having a first terminal and a second terminal wherein said first terminal is connected to one of said one or more leads; and
a reader device, said reader device including a control system, a radio module and a touch probe having a probe contact operatively coupled to said radio module, said radio module being adapted to generate one or more RF signals under the control of said control system, said probe contact being operatively coupled to said radio module for receiving said one or more RF signals and being structured to be temporarily brought into electrical contact with at least one of said antenna and said one of said one or more leads of said at least one transponder; wherein when said probe contact receives said one or more RF signals and is brought into electrical contact with at least one of said antenna and said one of said one or more leads of said at least one transponder, said one or more RF signals are communicated to said at least one transponder.

11. The transponder system according to claim 10, wherein said one or more leads comprise a first lead and a second lead, wherein said first terminal is connected to said first lead.

12. The transponder system according to claim 11, wherein said second terminal is connected to said second lead, wherein said probe contact is structured to be temporarily brought into electrical contact with at least one of said antenna, said first lead and said second lead, and wherein when said probe contact receives said one or more RF signals and is brought into electrical contact with at least one of said antenna, said first lead and said second lead, said one or more RF signals is communicated to said at least one transponder.

13. The transponder system according to claim 10, wherein touch probe is a mono-probe and said probe contact is the only contact of said touch probe.

14. A method of communicating with a transponder apparatus, said transponder apparatus including a substrate, one or more leads provided on said substrate, a chip having one or more contacts provided on said substrate, each of said one or more leads being electrically coupled to a respective one or more of said one or more contacts, and an antenna having a first terminal and a second terminal wherein said first terminal is connected to one of said one or more leads, the method comprising:
providing a reader device having a touch probe having a single probe contact;
generating one or more RF signals in said reader device and providing said one or more RF signals to said single probe contact; and
bringing at least one of said antenna and said one of said one or more leads of said transponder apparatus into electrical contact with said single probe contact to allow said one or more RF signals to be communicated to said transponder apparatus or to allow one or more transponder signals to be communicated from said transponder apparatus to said reader device.

15. The method according to claim 14, wherein said one or more leads comprise a first lead and a second lead, wherein said first terminal is connected to said first lead.

16. The method according to claim 15, wherein said second terminal is connected to said second lead, wherein said bringing comprises bringing at least one of said antenna, said first lead and said second lead into electrical contact with said single probe contact to allow said one or more RF signals to be communicated to said transponder apparatus or to allow one or more transponder signals to be communicated from said transponder apparatus to said reader device.

17. An RF reader device, comprising:
a control system;
a radio module adapted to generate one or more RF signals under the control of said control system; and
a touch probe having a single probe contact operatively coupled to said radio module, said single probe contact being structured to receive said one or more RF signals;
wherein said single probe contact is adapted to be temporarily brought into electrical contact with at least one of an antenna and one of one or more leads of a transponder apparatus to allow at least said one or more RF signals to be communicated to said transponder apparatus or to allow one or more transponder signals to be communicated from said transponder apparatus to said RF reader device.

18. A transponder system, comprising:

at least one transponder network, said at least one transponder network including a plurality of RFID straps, each of said RFID straps including a substrate, first and second leads provided on said substrate, and a chip having a memory and one or more contacts provided on said substrate, each of said first and second leads being electrically coupled to a respective one or more of said one or more contacts, wherein the first leads of each of said RFID straps are electrically coupled to one another by a first conductor and the second leads of each of said RFID straps are electrically coupled to one another by a second conductor; and a reader device, said reader device including a control system, a radio module and a touch probe having one or more probe contacts operatively coupled to said radio module, said radio module being adapted to generate one or more RF signals under the control of said control system, said one or more probe contacts being operatively coupled to said radio module for receiving said one or more RF signals and being structured to be temporarily brought into electrical contact with at least a portion of said at least one transponder network;

wherein when said one or more probe contacts receive said one or more RF signals and are brought into electrical contact with said at least a portion of said at least one transponder network, said one or more RF signals are communicated to each of said chips of said at least one transponder network.

19. The transponder system according to claim 18, wherein said one or more probe contacts are structured to be temporarily brought into electrical contact with said first conductor and said second conductor, and wherein when said one or more probe contacts receive said one or more RF signals and are brought into electrical contact with said first conductor and said second conductor, said one or more RF signals are communicated to each of said chips of said at least one transponder network.

20. The transponder system according to claim 18, wherein said at least one transponder network has an antenna having a first terminal and a second terminal wherein said first terminal is connected to said first conductor, wherein said one or more probe contacts comprise a single probe contact structured to be temporarily brought into electrical contact with at least one of said antenna and said first conductor, and wherein when said single probe contact receives said one or more RF signals and is brought into electrical contact with at least one of said antenna and said first conductor, said one or more RF signals are communicated to each of said chips of said at least one transponder network.

21. The transponder system according to claim 20, wherein said second terminal is connected to said second conductor, wherein said single probe contact is structured to be temporarily brought into electrical contact with at least one of said antenna, said first conductor and said second conductor, and wherein when said single probe contact receives said one or more RF signals and is brought into electrical contact with at least one of said antenna, said first conductor and said second conductor, said one or more RF signals are communicated to each of said chips of said at least one transponder network.

22. The transponder system according to claim 18, wherein each of said RFID straps is provided with a unique identifier to enable the memory thereof to be selectively accessed.

23. A method of communicating with a transponder network, said transponder network including a plurality of RFID straps, each of said RFID straps including a substrate, first and second leads provided on said substrate, and a chip having a memory and one or more contacts provided on said substrate, each of said first and second leads being electrically coupled to a respective one or more of said one or more contacts, wherein the first leads of each of said RFID straps are electrically coupled to one another by a first conductor and the second leads of each of said RFID straps are electrically coupled to one another by a second conductor, the method comprising:

providing a reader device having a touch probe having a one or more probe contacts;

generating one or more RF signals in said reader device and providing said one or more RF signals to said one or more probe contacts; and bringing said one or more probe contacts into electrical contact with at least a portion of said transponder network to allow said one or more RF signals to be communicated to each of said chips of said transponder network or to allow one or more transponder signals to be communicated from said transponder network to said reader device.

24. The method according to claim 23, wherein said transponder network has an antenna having a first terminal and a second terminal wherein said first terminal is connected to said first conductor, wherein said one or more probe contacts comprise a single probe contact structured to be temporarily brought into electrical contact with at least one of said antenna and said first conductor, and wherein said bringing said one or more probe contacts into electrical contact with at least a portion of said transponder network comprises bringing said one or more probe contacts into electrical contact with at least one of said antenna and said first conductor.

25. The method according to claim 24, wherein said second terminal is connected to said second conductor, wherein said bringing said one or more probe contacts into electrical contact with at least a portion of said transponder network comprises bringing said one or more probe contacts into electrical contact with at least one of said antenna, said first conductor and said second conductor.

26. The method according to claim 23, wherein each of said RFID straps is provided with a unique identifier to enable the memory thereof to be selectively accessed during said bringing step.

\* \* \* \* \*

UNITED STATES PATENT AND TRADEMARK OFFICE
CERTIFICATE OF CORRECTION

PATENT NO. : 7,825,807 B2  
APPLICATION NO. : 11/971292  
DATED : November 2, 2010  
INVENTOR(S) : Marlin H. Mickle et al.

It is certified that error appears in the above-identified patent and that said Letters Patent is hereby corrected as shown below:

Title Page, Item (57) ABSTRACT, line 2, "transponders" should read --transponder--.  
Column 4, line 34, "REID" should read --RFID--.  
Column 4, line 36, "having a one" should read --having one--.  
Column 5, line 21, "are a schematic diagrams" should read --are schematic diagrams--.  
Column 5, line 28, "a aspect" should read --an aspect--.  
Column 7, lines 64 and 65, "Powering Automonous Harvesting with Multiple Antennas in the Same Space," should read --"Powering Autonomous Cubic-Millimeter Devices,"--.  
Column 8, line 49, "will used" should read --will be used--.  
Column 9, line 63, "is proceed" should read --is provided--.  
Column 10, line 9, "mono-probe a described" should read --mono-probe as described--.  
Column 10, line 30, "rather then" should read --rather than--.  
Column 11, line 41, "in manner" should read --in a manner--.  
Column 11, line 45, "in manner" should read --in a manner--.  
Column 11, line 49, "in manner" should read --in a manner--.  
Column 14, line 23, "having a" should read --having--.

Signed and Sealed this  
Seventeenth Day of May, 2011

David J. Kappos  
*Director of the United States Patent and Trademark Office*